C. R. TWITCHELL.
FASTENING FOR DEMOUNTABLE RIMS.
APPLICATION FILED MAY 26, 1910.
1,008,573.
Patented Nov. 14, 1911.
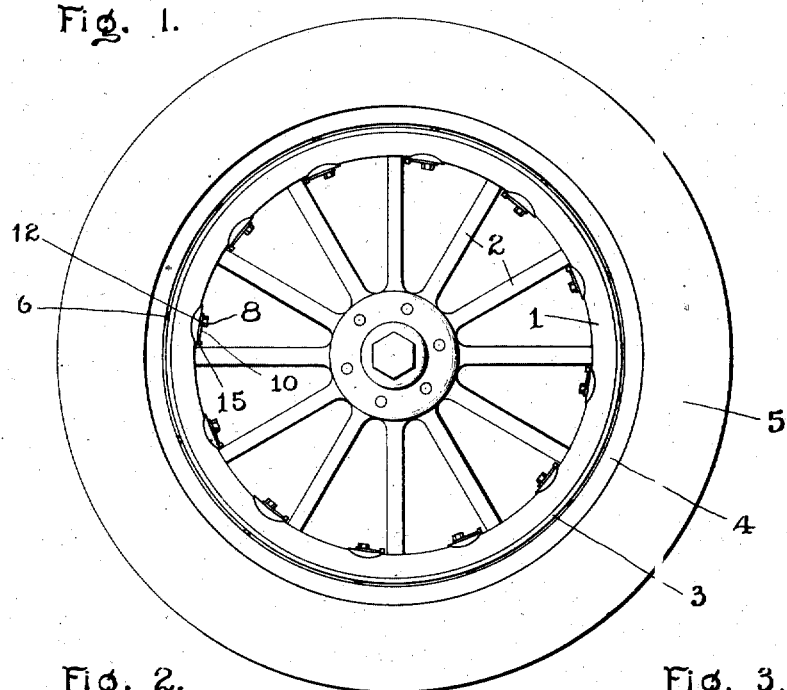
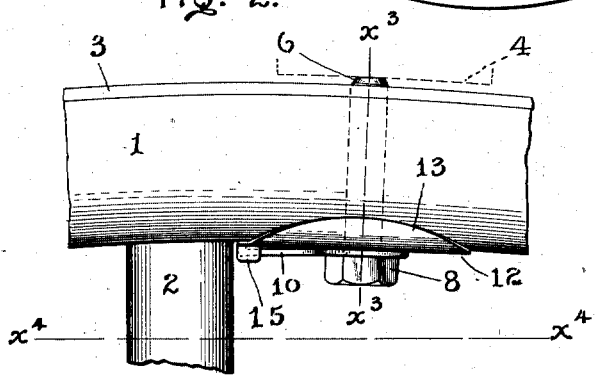
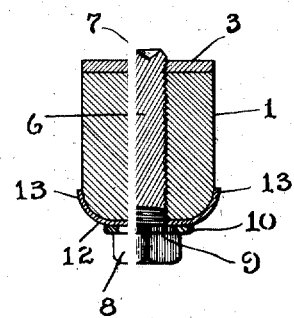
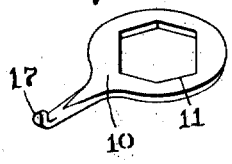
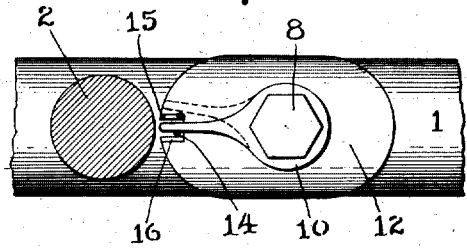
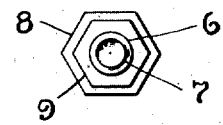
Witnesses:—
Inventor
Charles R. Twitchell.

UNITED STATES PATENT OFFICE.

CHARLES R. TWITCHELL, OF LOS ANGELES, CALIFORNIA.

FASTENING FOR DEMOUNTABLE RIMS.

1,008,573.  Specification of Letters Patent.  Patented Nov. 14, 1911.

Application filed May 26, 1910. Serial No. 563,657.

*To all whom it may concern:*

Be it known that I, CHARLES R. TWITCHELL, a citizen of the United States, residing at Los Angeles, in the county of Los Angeles and State of California, have invented a new and useful Fastening for Demountable Rims, of which the following is a specification.

This invention relates to a fastening for demountable rims, and has for its object to produce a fastening which is very simple and economical in construction, which will securely hold the rim in place, and which may be readily operated to remove the rim.

One of the most important objects is to so construct the fastening that it does not require any mechanical knowledge for its operation, it being so simple that a woman or child can operate it.

Referring to the drawings:—Figure 1 is a side elevation of a wheel equipped with the invention. Fig. 2 is a side elevation of a portion of the felly and adjacent spoke, showing one of the fastening means in position. Fig. 3 is a sectional view on line $x^3$—$x^3$ Fig. 2. Fig. 4 is a section on line $x^4$—$x^4$ Fig. 2. Fig. 5 is an end elevation of the bolt. Fig. 6 is a perspective view of the locking arm.

1 designates the felly supported by spokes 2. Encircling the felly 1 and securely fastened thereto is a metallic band 3.

4 designates the demountable rim carrying the tire 5. The rim 4 may be of any desired form of construction and any method of securing the tire thereto may be employed.

A series of fastening means are provided, one being preferably located between each pair of spokes, or if desired half that number could be employed, leaving one between every other pair of spokes. Each fastening means comprises a bolt 6 which is screwed through the felly and through the band 3, the end of each bolt being beveled and cupped to form a sharp circular edge 7 similar to the end of a set screw. Bolt 6 is provided with a head 8, and formed on the head 8 is a hexagonal shoulder 9, as clearly shown in Figs. 3 and 5. Fitting on the hexagonal shoulder 9 is an indicator and locking arm 10, shown in detail in Fig. 6, and formed with a hexagonal head 11 which fits the hexagonal shoulder 9. A plate 12 lies against the felly 1, its edges 13 being bent down on each side of the felly to prevent the plate from turning on the felly, and the bolt 6 passes through the plate 12, the indicator and locking arm 10 lying next the plate 12. Each plate 12 has a notch 14 formed by bending up a lip 15 in one edge of the plate, and the edge of the notch opposite the lip 15 is beveled as at 16.

The indicating and locking arm 10 has a rounded lug 17 which is adapted to be received in the notch 14 when the bolt is screwed in so that its end 7 protrudes through the band 3, as shown in Figs. 1, 2 and 3, and securely grips the inner face of the demountable rim 4, thereby holding the latter in position. The bolt 6 when in this position is prevented from unscrewing by the locking arm 10, the lugs 17 of which lie within the notch 14. When it is desired to remove the demountable rim, a wrench is applied to the head 8 and the bolt 6 is turned in a direction to unscrew it. When sufficient power is applied by means of the wrench to turn the bolt, the rounded lug 17 of the locking arm 10 rides up the beveled edge 16, the arm 10 being of spring material so that the lug 17 is released from notch 14 and the arm 10 continues to turn as the bolt 6 is unscrewed. The bolt 6 is turned in the direction to unscrew it through substantially one complete revolution, or until the locking and indicating arm 10 has been moved against the opposite side of the upturned lip 15 into the dotted line position shown in Fig. 4, and when in this position it is obvious that the bolt 6 has been turned back a distance equal to the thickness of one thread which is sufficient to withdraw its sharp edge 7 from engagement with the demountable rim 4. It is obvious that not only the exact amount which the bolt is turned is indicated by the arm 10, but that the arm 10 also acts to positively prevent the bolt from being unscrewed more than one revolution, as the lip 15 prevents the arm 10 from passing beyond the point shown in dotted lines in Fig. 4. Thus it is impossible for anyone to unscrew the fastening bolts too far, one complete turn of each fastening bolt being all that is required or that is permitted, and when all of the bolts have been turned this amount the demountable rim may be slipped off without hindrance, and another one slipped in place. The bolts are then turned in the reverse direction until the lug 17 of each arm 10 lies within its adjacent notch 14. It will be understood that in screwing back the bolts the arms 10 again act to prevent the bolts from being turned too far, as each lip acts as a positive stop to arrest the arm 10 when its lug 17 has again entered the notch 14. The arms 10 while of spring material, are, nevertheless, sufficiently stiff to retain the lugs 17 in the notches 14 unless a wrench is applied to turn the bolts 6, so that the bolts cannot possibly unscrew accidentally.

I prefer to arrange each fastening device close to the adjacent spoke, as shown in Fig. 1, so that the lateral strain on the felly is applied at a point close to the spoke and distortion of the felly is thus obviated.

What I claim is:—

1. A felly, a demountable rim therefor, a locking bolt screwed through the felly and adapted to detachably engage the inner face of the demountable rim, a plate on the felly formed with a locking recess and with a lip at the recess, said locking bolt extending through said plate, an arm of spring material extending laterally from the bolt and provided with a lug adapted to enter said notch.

2. A felly, a demountable rim therefor, a locking bolt screwed through the felly and adapted to detachably engage the inner face of the demountable rim, a plate on the felly formed with a locking recess and with a lip at the recess, said locking bolt extending through said plate, an arm of spring material extending laterally from the bolt and provided with a lug adapted to enter said notch, the side wall of the notch opposite the lip being beveled, the lug on the spring arm being rounded.

3. A felly, a demountable rim therefor, a locking bolt screwed through the felly and adapted to detachably engage the inner face of the demountable rim, a plate on the felly formed with a locking recess and with a lip at the recess, said locking bolt extending through said plate, an arm of spring material extending laterally from the bolt and provided with a lug adapted to enter said notch, the side wall of the notch opposite the lip being beveled, the lug on the spring arm being rounded, the locking bolt having a hexagonal shoulder, said spring arm having a head with a hexagonal recess fitting the hexagonal shoulder, a band encircling the felly, said bolt being also screwed through said band, the edges of said plate being bent over the side faces of the felly, said bolt having a hexagonal head to receive a wrench.

In testimony whereof, I have hereunto set my hand at Los Angeles, California, this 20th day of May 1910.

CHARLES R. TWITCHELL.

In presence of—
G. T. HACKLEY,
FRANK L. A. GRAHAM.

---

Copies of this patent may be obtained for five cents each, by addressing the "Commissioner of Patents, Washington, D. C."